United States Patent
Doherty et al.

(10) Patent No.: US 11,051,248 B2
(45) Date of Patent: Jun. 29, 2021

(54) RADIO-FREQUENCY WAKEUP FOR VEHICLE SYSTEMS

(71) Applicant: Analog Devices International Unlimited Company, Limerick (IE)

(72) Inventors: Lance Robert Doherty, Boston, MA (US); Shane O'Mahony, Grenagh (IE); Philip Eugene Quinlan, Glounthaune (IE); Mark Alan Lemkin, Berkeley, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/294,312

(22) Filed: Mar. 6, 2019

(65) Prior Publication Data
US 2020/0288395 A1     Sep. 10, 2020

(51) Int. Cl.
*H04W 52/02* (2009.01)
*H04L 1/00* (2006.01)

(52) U.S. Cl.
CPC ....... *H04W 52/0229* (2013.01); *H04L 1/0003* (2013.01); *H04W 52/028* (2013.01)

(58) Field of Classification Search
CPC ........... H04W 52/0229; H04W 52/028; H04W 84/18; H04W 52/0261; H04L 1/0003; H02J 7/025; H02J 50/00; H02J 50/80; H02J 7/00034; G01D 21/00
See application file for complete search history.

(56) References Cited

U.S. PATENT DOCUMENTS

| | | | |
|---|---|---|---|
| 5,568,122 A | 10/1996 | Xydis | |
| 5,680,112 A | 10/1997 | Xydis | |
| 7,221,668 B2 | 5/2007 | Twitchell, Jr. | |
| 2005/0162172 A1 | 7/2005 | Bertness | |
| 2006/0100002 A1* | 5/2006 | Luebke | G06F 3/0362 455/574 |
| 2007/0263574 A1 | 11/2007 | Lu et al. | |
| 2008/0108318 A1 | 5/2008 | Min et al. | |

(Continued)

FOREIGN PATENT DOCUMENTS

| | | |
|---|---|---|
| CN | 104637273 B | 9/2018 |
| KR | 200361755 Y1 | 9/2004 |

OTHER PUBLICATIONS

Magno, Michele, et al., "An Ultra Low Power High Sensitivity Wake-Up Radio Receiver with Addressing Capability", 2nd Intl. Workshop on Green Optimized Wireless Networks, (2014), 8 pgs.

(Continued)

*Primary Examiner* — Dady Chery
(74) *Attorney, Agent, or Firm* — Schwegman Lundberg & Woessner, P.A, (57) ABSTRACT

A system and method for monitoring components of a vehicle includes a manager and a wireless node. The manager is positioned on the vehicle and configured to wirelessly transmit a wake signal in response to an event. The wireless node positioned to monitor a component of the vehicle and includes an antenna, a wakeup circuit, and a node transceiver. The wakeup circuit is connected to the antenna and configured to monitor for the wake signal, and the node transceiver is configured to perform wireless communication with the manager. The wakeup circuit is configured to power on the node transceiver upon receipt of the wake signal.

20 Claims, 10 Drawing Sheets

(56) References Cited

U.S. PATENT DOCUMENTS

| | | | |
|---|---|---|---|
| 2011/0148349 A1* | 6/2011 | Kim | H02J 50/00 320/108 |
| 2014/0112229 A1* | 4/2014 | Merlin | H04W 52/0209 370/311 |
| 2014/0113689 A1 | 4/2014 | Lee | |
| 2014/0254445 A1 | 9/2014 | Heinzelman et al. | |

OTHER PUBLICATIONS

Milosiu, Heinrich, et al., "Ultra Low-Current WakeUp Receiver with Energy Harvesting", Fraunhofer Institute for Integrated Circuits IIS, (Jul. 6, 2010), 30 pgs.

* cited by examiner

RADIO-FREQUENCY WAKEUP FOR VEHICLE SYSTEMS

TECHNICAL FIELD

This document pertains generally, but not by way of limitation, to radio-frequency (RF) wakeup, and particularly but not by way of limitation to RF wakeup for vehicle monitoring systems.

BACKGROUND

Wireless networks provide communication between nodes without the cost and complexity of routing cables. Wireless nodes can be distributed in remote or otherwise hard-to-reach locations. The nodes can include one more local power sources configured to provide power for the node. To conserve power, the nodes can "sleep" or otherwise operate in a low-power mode.

SUMMARY

It is desirable to power down components of a remote sensor when not in active use in order to conserve power. To achieve this, a main connectivity radio must be powered on any time the sensor is required to sense and/or report data. Some present systems use polling to "turn-on" the main connectivity radio every so often and check for a system-on signal from a system controller. Each time the transceiver turns on, power is consumed by the wireless sensor. This duty-cycle based approach can also cause significant latency in establishing a connection with the system controller.

The present inventors have recognized, among other things, that it can be desirable to utilize a low-power radio-frequency (RF) wakeup approach in a wireless vehicle component monitoring node. The components of the node, such as the main connectivity radio, can be shut down or operated in a low power mode during a sleep or other low power mode of operation. RF wakeup components, which in some examples can include a physically separate RF wakeup receiver, can continuously monitor for a wakeup packet, which can be modulated in a different manner than other data communication, for example, from a manager of the vehicle monitoring system. Once the RF wakeup packet is received, the RF wakeup components can power on other components of the wireless node, such as the main connectivity radio. Because the RF wakeup components consume much less power than the main connectivity radio, the overall system-off power consumption of the node can be reduced while also reducing the turn-on latency of the wireless node by allowing continuous monitoring for a wakeup packet.

In one example, a system for monitoring components of a vehicle includes a manager and a wireless node. The manager is positioned on the vehicle and configured to wirelessly transmit a wake signal in response to an event. The wireless node positioned to monitor a component of the vehicle and includes an antenna, a wakeup circuit, and a node transceiver. The wakeup circuit is connected to the antenna and configured to monitor for the wake signal, and the node transceiver is configured to perform wireless communication with the manager. The wakeup circuit is configured to power on the node transceiver upon receipt of the wake signal.

In another example, a method of powering on a system for monitoring a component of a vehicle includes transmitting, by a manager positioned on the vehicle, a wakeup signal in response to a vehicle event; receiving, by a wakeup circuit of a wireless node, the wakeup signal through an antenna connected to the wakeup circuit, wherein the wireless node is positioned to monitor the component of the vehicle; powering on, by the wakeup circuit, a node transceiver of the wireless node in response to receipt of the wakeup signal; and transmitting, by the node transceiver, data to the manager.

In another example, a system for wirelessly monitoring a component of a vehicle includes a manager and a plurality of wireless nodes. The manager is positioned on the vehicle and configured to wirelessly transmit at least one wakeup packet in response to a vehicle event. The plurality of wireless nodes are each positioned to monitor a component of the vehicle. Each wireless node includes an RF wakeup circuit and a node transceiver. The RF wakeup circuit is connected to the antenna and configured to monitor received radio-frequency energy for the at least one wakeup packet. The node transceiver is configured to perform wireless communication with the manager, wherein the RF wakeup circuit is configured to power on the node transceiver upon receipt of the wakeup packet.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A wireless system is disclosed herein that employs radio-frequency (RF) wakeup for wireless nodes. The system can be used in environments that benefit from low power operation. In an example, the wireless system is a wireless battery monitoring system for a vehicle. Each wireless node can be positioned to sense a characteristic of one or more battery cells, such as a current through the cells or a voltage across the cells, for example. To facilitate low power operation and fast turn-on for the system, each wireless node employs low-power RF components, such as an RF wakeup receiver. The RF wakeup components can be connected to a dedicated antenna, or an antenna shared with a primary transceiver of the node. The RF wakeup components are configured to monitor RF energy received at the node for a wakeup signal, such as a wakeup packet, from a manager of the system. The wakeup packet can have wireless link parameters different from those used during normal data communication through the primary transceiver, for example.

Generally available techniques of turning on wireless nodes involve polling, by periodically turning on the primary transceiver to search for a network connection request. By contrast, the present inventors have developed a scheme that employs low power RF wakeup components, such as a dedicated RF wakeup receiver, for each wireless node, to continuously monitor for a wakeup signal from a network manager. This improves overall power usage of the node and latency during turn-on of the wireless system.

Figure 1:
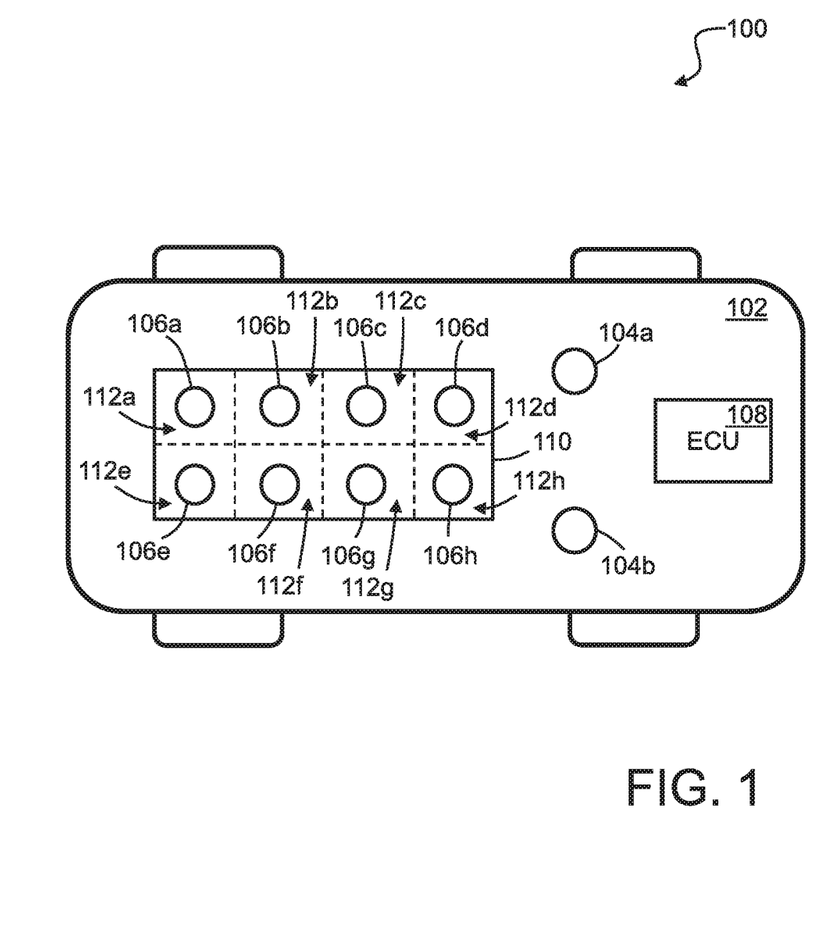
FIG. 1 is a diagram illustrating a wireless battery monitoring system for a vehicle.

FIG. 1 is a diagram illustrating a system 100 for a vehicle 102 that employs RF wakeup for system turn-on. The vehicle 102 includes network managers 104a and 104b, wireless nodes 106a-106h, an electronic control unit (ECU) 108, and a battery pack 110 that includes battery modules 112a-112h. Each battery module 112a-112h can include several battery cells. In one example, each module 112a-112h includes 12 battery cells. In other embodiments, each module 112a-112h can include any number of battery cells. While illustrated as a wireless battery monitoring system, the system 100 can be used for monitoring any component of a vehicle or other apparatus within which a low-power and low-latency system turn-on is desired.

The wireless nodes 106a-106h can be wireless sensors, for example, configured to sense operational characteristics of the battery cells of each of the battery modules 112a-112h, including, but not limited to, a voltage across or current through a respective battery module 112a-112h. The network managers 104a and 104b can collect the sensed data from the wireless nodes 106a-106h, for example, and provide the data to a host application running on the ECU 108 or other system through a wired or wireless connection. The host application can use the data to monitor the health of, and provide control for, the battery pack 110. The wireless nodes 106a-106h and network managers 104a and 104b can be configured using a mesh network topology, a star topology, a multi-hop topology, or any other wireless network configuration.

In an example, the ECU 108 is configured to execute a host application for the battery monitoring system. While described in this example as hosted by the ECU 108, the host application can be executed by any other computing system. For example, the host application can be executed by one of the managers 104a and/or 104b. The ECU 108 can include, for example, software, hardware, and combinations of hardware and software configured to execute several functions related to control of the battery monitoring system. The ECU 108 can include controllers or processors such as any one or more of a microprocessor, a controller, a digital signal processor (DSP), an application specific integrated circuit (ASIC), a field-programmable gate array (FPGA), or equivalent discrete or integrated logic circuitry. The ECU 108 can also include storage devices, including short-term and/or long-term memory that can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

Figure 2A:
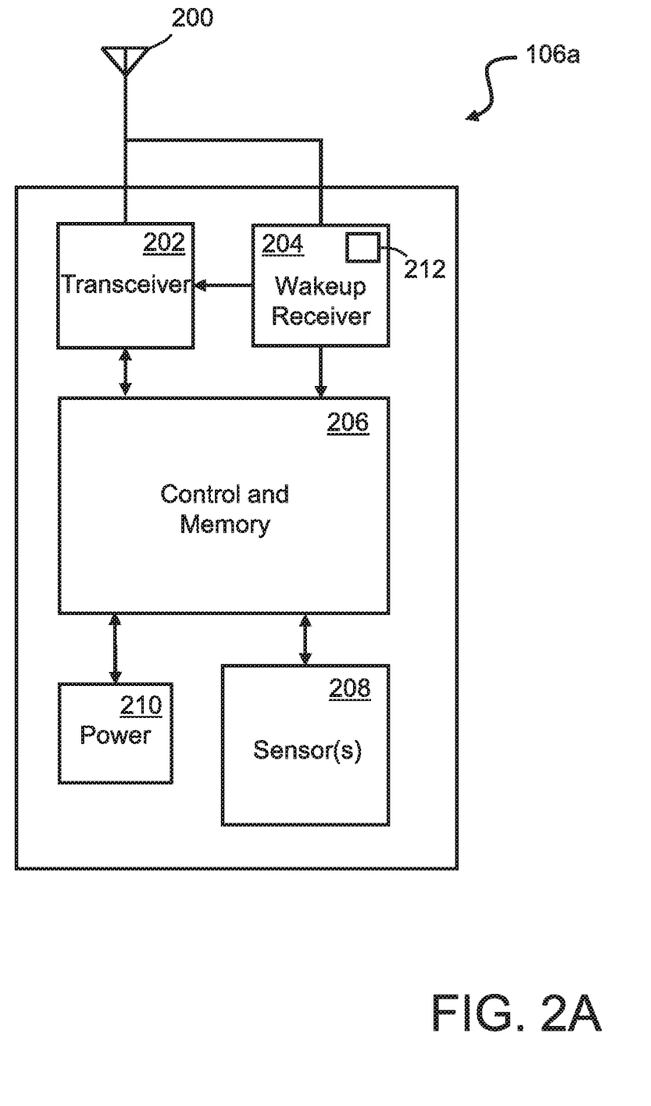
FIGS. 2A and 2B are block diagrams illustrating example wireless nodes with radio-frequency (RF) wakeup capability.
Figure 2B:
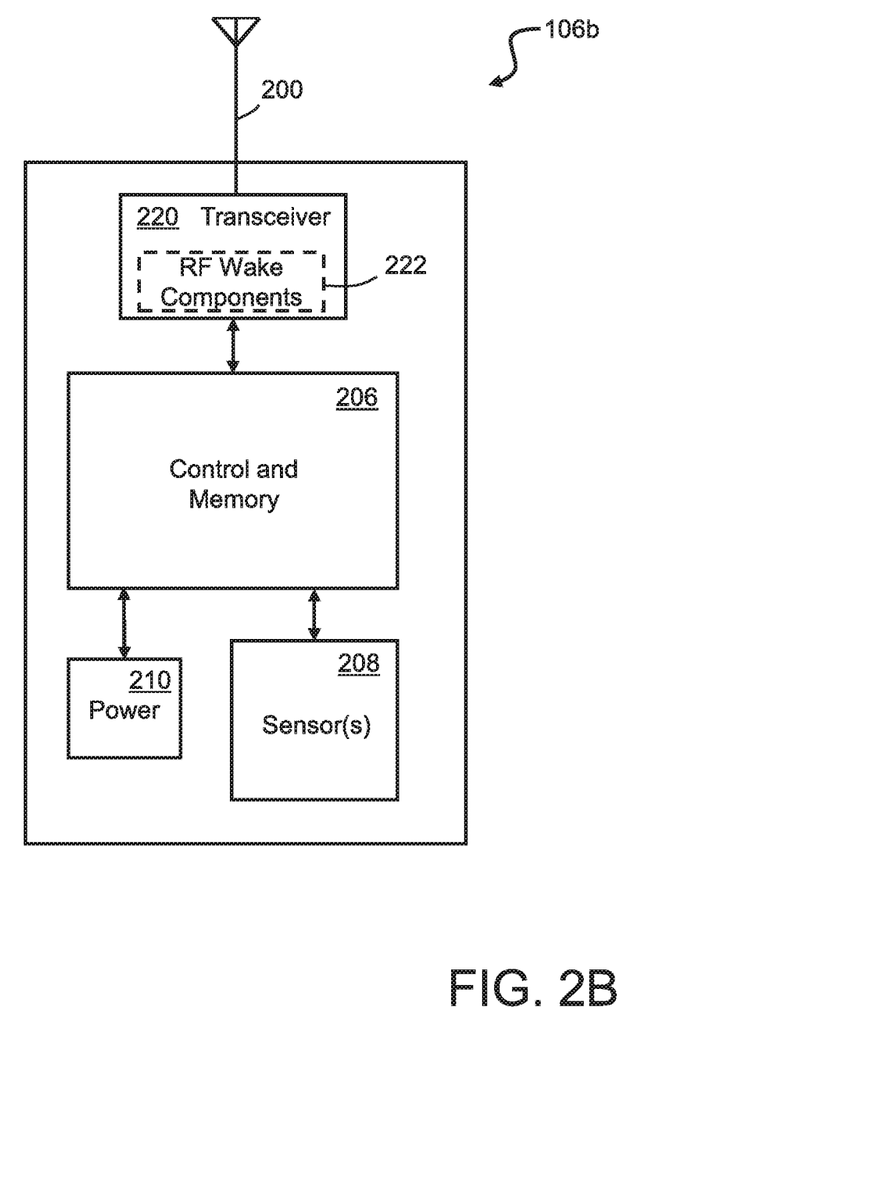
Figure 2C:
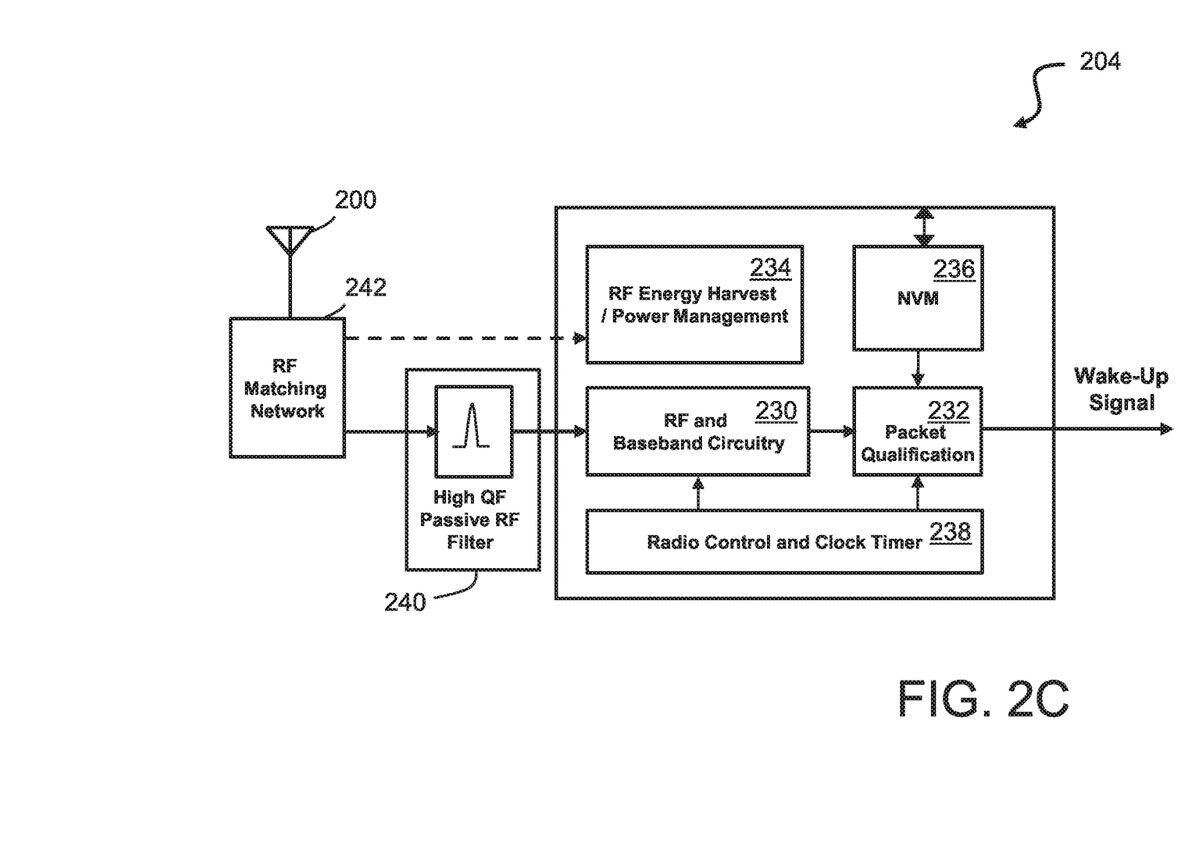
FIG. 2C is a block diagram illustrating an example radio-frequency (RF) wakeup receiver.
Figure 2D:
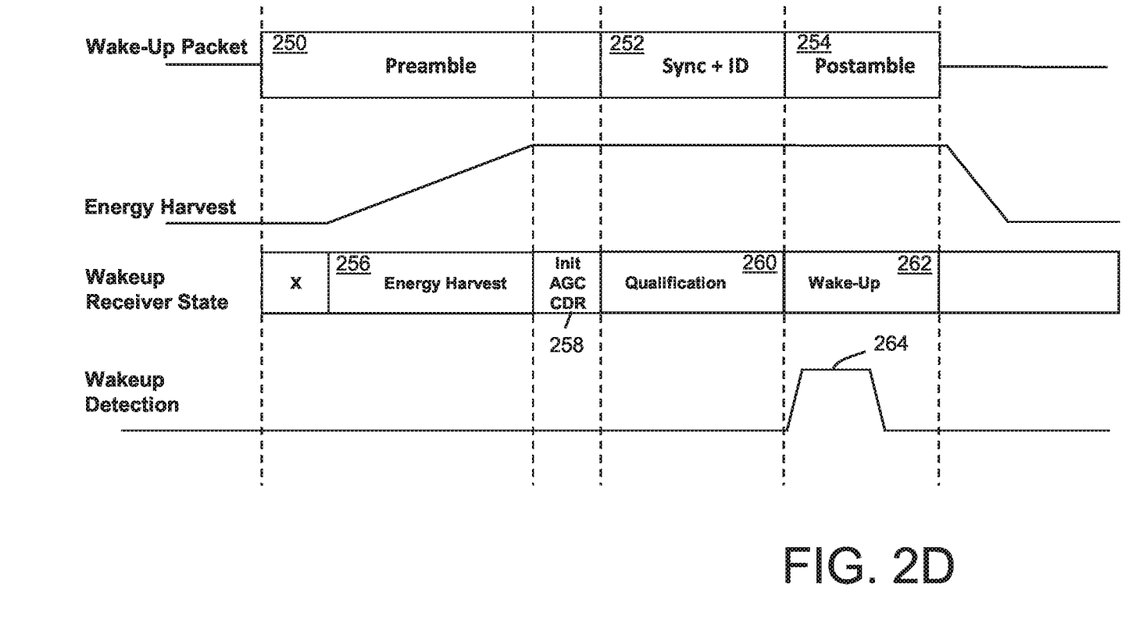
FIG. 2D is a diagram illustrating an example wake packet and handling of a wakeup packet by an example radio-frequency (RF) wakeup receiver.

FIGS. 2A and 2B are block diagrams illustrating example wireless nodes 106a and 106b with RF wakeup capability, FIG. 2C is a block diagram illustrating an example RF wakeup receiver, and FIG. 2D is a diagram illustrating an example wakeup packet. FIG. 2A is a block diagram illustrating an example wireless node 106a that includes a primary transceiver 202 and a separate RF wakeup receiver 204. The primary receiver 202, for example, can be a main connectivity radio of the node 106a, and the RF wakeup receiver 204 can be a physically separate receiver from the transceiver 202. The wireless node 106a, for example, can be any of nodes 106a-106h of FIG. 1.

In the example illustrated in FIG. 2A, the wireless node 106a also includes a shared antenna 200, a control and memory circuit 206, sensors 208, and a battery 210. The wakeup receiver 204 can include a local timer 212 for use in duty cycling the wakeup receiver 204, for example. In other examples, the node 106a can include other circuit elements in addition to, or in place of, the components illustrated in FIG. 2. For example, the wake receiver 204 can include its own dedicated antenna, rather than share the antenna 200. In some examples, the primary transceiver 202 may operate in the 2.4 GHz industrial, scientific, and medical radio band (ISM band) and the RF wakeup receiver 204 may operate in the 915 MHz ISM band or any other RF band, making it desirable for the RF wakeup receiver 204 to have its own dedicated antenna.

In an example, the control and memory circuit 206 can include one or more controllers including FPGAs, DSPs, microprocessors, application specific integrated circuits (ASICs) or other digital logic circuits, and one or more volatile or non-volatile memories. The sensors 208 can be configured, for example, to sense data regarding a vehicle battery such as a voltage across one or more battery cells, current through one or more battery cells, battery cell temperature, or other characteristics. The battery 210 can be a local battery, any other local energy storage device such as a capacitor or energy harvester, or can be a wired connection to an external power source such as the cells of the vehicle battery module being monitored. The wakeup receiver 204 can also include its own local energy source such as a battery, capacitor, or energy harvester.

It can be advantageous to have components of the wireless node 106 either completely powered down ("deep sleep") or operating in a very low power mode when not actively in use. In an example, the transceiver 202, the control and memory circuit 206, and the sensors 208 can all be in deep sleep or operating in a low power mode. The wakeup receiver 204 can monitor the RF energy received by the antenna 200 for a wakeup packet, for example. Upon receipt of the wakeup packet, the wakeup receiver 204 can output a signal, such as an interrupt signal, to power on one or more of the transceiver 202, the control and memory circuit 206, and the sensors 208. In an example, to conserve power from the battery 210, the wakeup receiver 204 can include an energy harvester, which can be configured to scavenge energy from received RF energy (as described in greater detail below), vibration, heat, light, or any other source available based on the application.

The wakeup receiver 204 can be any low-power receiver capable of detecting a wakeup packet received through the antenna 200. In an example, the wakeup receiver 204 can be an ultra-low power (ULP) single or multi-channel receiver that supports signal processing. For example, the wakeup receiver 204 can support RF on-off keying (OOK) envelope detection, frequency-shift keying (FSK), or any other established phase, frequency, or amplitude modulation technique. In some examples, the wakeup receiver 204 can be a regenerative receiver or a tuned RF receiver, operating on a single wake-up channel or on multiple wake-up channels. U.S. Patent Application Publication No. 2018/0139698 describes an example multi-channel wakeup receiver. The wakeup receiver 204 can also be a ULP polar receiver, an uncertain intermediate frequency (IF) receiver, or a receiver that employs N-path filtering. In some examples, the wakeup receiver 204 can be a heterodyne receiver that supports zero-IF or low-IF quadrature architectures. An example implementation of the wakeup receiver 204 is illustrated in FIG. 2C.

The wakeup receiver 204 can include a timer 212 to support duty cycling of the wakeup receiver 204. In some examples, in place of the timer 212, the control and memory 206 can include a timer for the wireless node 106 that remains powered in a low-power mode for use by the wakeup receiver 204. During system operation, for example, the wireless node 106 can sync its timer with that of the managers 104a and 104b. In an example, the time can be synchronized based on received messages from the manager 104a and 104b. For example, data packets received through the primary transceiver 202 from one of the managers 104a and 104b can have a time stamp included as part of the transmitted packet. The time stamp can be obtained from the transmitted packet and used by the node 106 to synchronize its own time.

Using either the local timer 212 or another timer of the node 106, the wakeup receiver 204 can power up and down while monitoring for an RF wakeup packet in order to further conserve energy for the node 106. In one example, the RF wakeup packet can use a 1% duty cycle, powering up for 10 ms of each second to monitor for the wakeup packet, greatly reducing the amount of power used by the wakeup receiver 204 during the low power mode of the node 106. This is advantageous in systems for which it is desirable or acceptable to increase latency to further decrease power consumption.

FIG. 2B is a block diagram illustrating another example wireless node 106b. Instead of a separate wakeup receiver 204, the wireless node 106b includes a transceiver 220 that includes integrated RF wakeup components 222. The RF wakeup components 222 are low power components that are configured to monitor received RF energy for a wakeup packet, for example. Upon receipt of a wakeup packet, the RF wakeup components 222 can power on the remaining components of the transceiver 220 and/or other components of the wireless node 106b.

FIG. 2C is a block diagram of an example RF wakeup receiver 204. The example wakeup receiver 204 illustrated in FIG. 2C includes RF and baseband circuitry 230, packet qualification 232, power management 234, non-volatile memory (NVM) 236, and radio control and clock timer 238. A high quality factor (QF) passive RF filter 240 can be positioned to filter the incoming signal and attenuate unwanted RF interference signals at the antenna 200, and an RF matching network 242 can be positioned to provide impedance matching for the RF wakeup receiver 204.

The RF and baseband circuitry 230 can be configured to receive the RF signal and convert the RF signal to a digital baseband. In one example, the RF wakeup receiver 204 can be a single channel receiver configured to demodulate a signal using on-off keying (OOK) or frequency shift keying (FSK). In other examples, the RF and baseband circuit 230 can handle received signals on any number of channels using any desirable modulation scheme.

The packet qualification 232 is hardware and/or software configured to detect a wakeup packet from the demodulated baseband signal. In the example illustrated in FIG. 2C, the power management 234 includes RF energy harvesting. For example, RF energy can be harvested directly from the received wakeup packet. In other examples, the RF wakeup receiver 204 can scavenge energy from other RF devices that may be broadcasting signals in neighboring bands, rather than from the wakeup packet itself. In such cases, the wakeup receiver 204 can store the scavenged RF energy in a capacitor for use at a later time, or can use the scavenged energy to provide charge to maintain energy in a local battery. In other examples, a battery, capacitor, another form of energy harvesting, or any other power source can be used to power the RF wakeup receiver 204.

The NVM 236 is any form of non-volatile memory, such as flash memory, and can be configured to store an identifier that can be used by the packet qualification 232, for example, to verify that a wakeup packet is intended for the respective RF wakeup receiver 204 and the authenticity of the source. The radio control and clock timer 238 is configured to control the timing of activation of components of the RF wakeup receiver 204. In an example, the radio control and clock timer 238 can be used to control the states discussed below with respect to FIG. 2D.

FIG. 2D is a signal diagram illustrating an example process of receiving a wakeup packet. In this example, the wakeup packet includes a preamble 250, a sync and identification (ID) field 252, and a postamble 254. In other examples, the wakeup packet can include further or alternative fields. For the example illustrated in FIG. 2D, the wakeup receiver includes an energy harvester that provides power through energy harvested from received RF energy. When the wakeup receiver 204 begins receiving the preamble 250, the wakeup receiver 204 enters an energy harvest state 256. The RF wakeup receiver 204 harvests RF energy from the preamble to power the components of the wakeup receiver 204. Because the wakeup receiver 204 harvests energy from the preamble 250, the preamble 250 is transmitted for a longer time than for wakeup receivers 204 that do not harvest RF energy directly from the wakeup packet. The preamble 250 is transmitted for any amount of time for the RF wakeup receiver 204 to harvest a sufficient amount of energy to power the components of the RF wakeup receiver 204.

Once sufficient energy has been harvested from the preamble 250, the wakeup receiver 204 transitions to an automatic gain control (AGC) and clock and data recovery (CDR) state 258 for the remainder of the preamble 250. For the sync and identification field 252 of the wakeup packet, the RF wakeup receiver 204 transitions to a qualification state 260 to extract data from the sync and ED field 252, such as an identifier, for example, to verify that the wakeup packet is intended for the respective wakeup receiver 204. In other examples, the sync and ID field 252 can include further information related to security, time, or any other desirable information. Following the sync and ID field 252, the wakeup receiver 204 transitions to the wake-up state 262 and generates a wake signal 264, which can be used as an interrupt signal, for example, to wake other components of a respective wireless node 206.

Figure 3A:
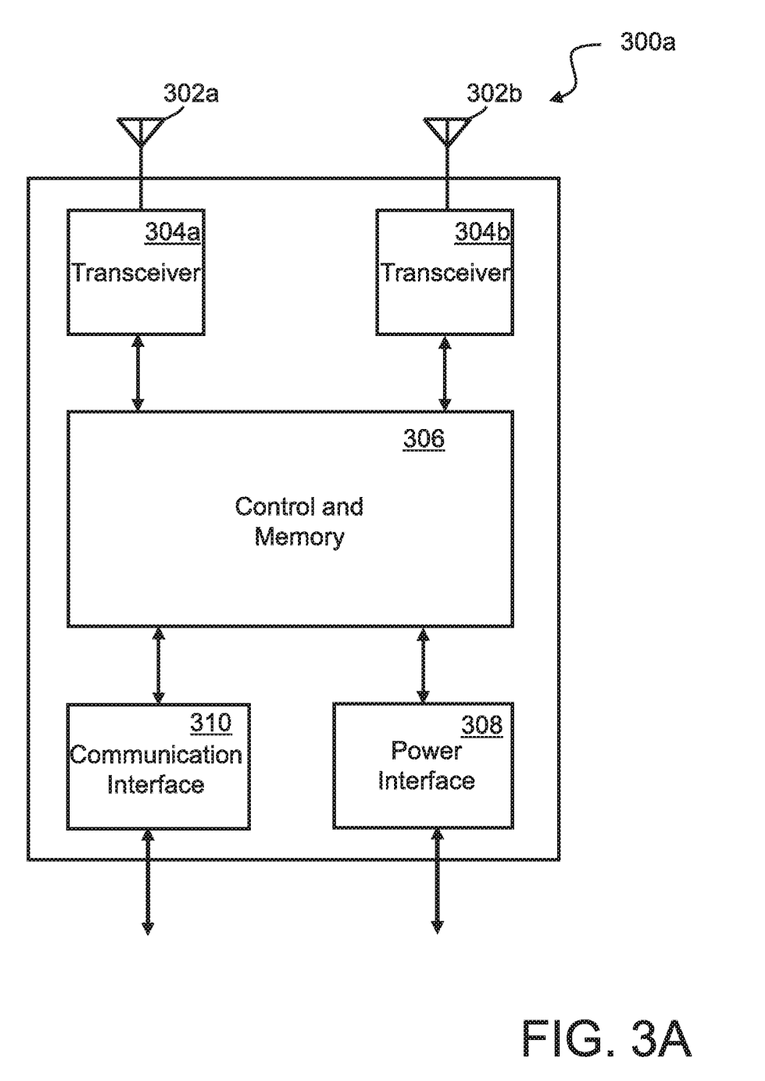
FIGS. 3A and 3B are block diagrams illustrating example managers for a wireless battery monitoring system.
Figure 3B:
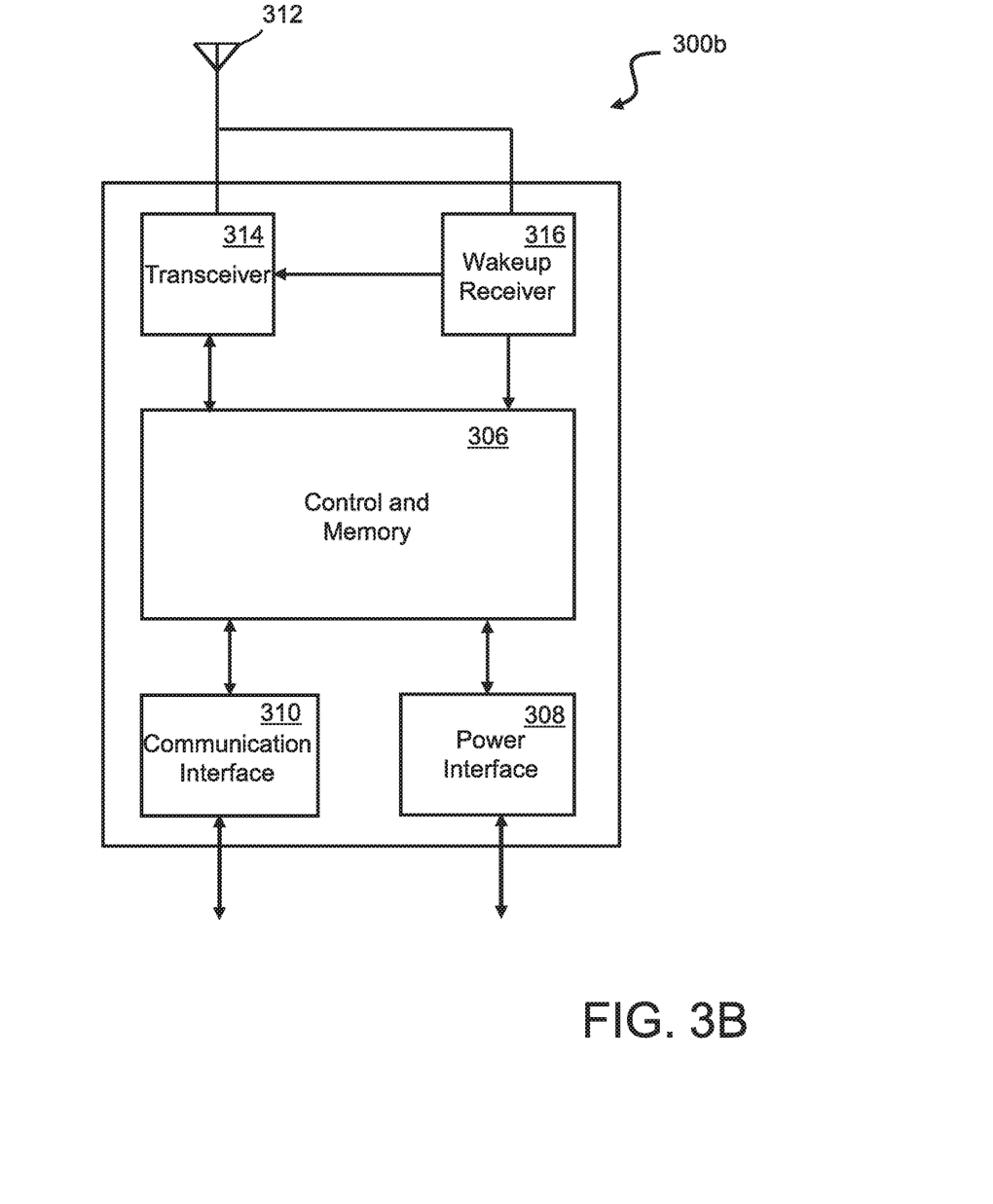

FIGS. 3A and 3B are block diagrams illustrating example managers 300a and 300b. The managers 104a and 104b of FIG. 1 can be implemented as either of the example managers 300a and 300b. The manager 300a includes two antennas 302a and 302b connected to respective transceivers 304a and 304b. The manager 300b includes a single antenna 312, a primary transceiver 314, and a wakeup receiver 316. Both managers 300a and 300b include a control and memory circuit 306, a power interface 308, and a communication interface 310. While illustrated as two examples, other example managers can include any number of antennas using any number of respective transceivers and/or wakeup receivers.

The manager 300a can be a primary manager, for example, or can be a secondary manager. If used as a secondary, or backup manager, the manager 300a may also enter a low-power mode along with the wireless nodes 106a-106h when the system is not actively in use. Thus, the manager 300a can also be woken up using an RF wakeup signal from the primary manager. The manager 300a can utilize one of its primary transceivers 304a and 304b as a wakeup receiver, while the manager 300b has a dedicated wakeup receiver 316.

During normal system operation, the manager 300a can use its transceivers 304a and 304b to communicate with multiple nodes on multiple channels simultaneously, for example, or to redundantly receive the same data and employ antenna diversity to select the best signal for a respective frequency channel. When in low power mode, one of the transceivers 304a or 304b can remain powered on (or can be duty cycled) to monitor for a wakeup signal. Upon receiving the wakeup signal, the respective transceiver 304a or 304b can provide a signal to power on the remaining components of the manager 300a.

During normal system operation, the manager 300b can use its primary transceiver 314 to communicate with the wireless nodes 106a-106h. While in low power mode, the wakeup receiver 316 can remain powered on and listening for the wakeup signal from the primary manager. The wakeup receiver 316 can be configured using any of the above-mentioned methods with respect to the wakeup receiver 204.

In an example, the control and memory circuit 306 of the managers 300a and 300b can include one or more application-specific or general-purpose processor circuits. Such circuits can include system-on-chip (SoC) realization or such circuits can be field-programmable. As an illustrative example, the control and memory circuit 306 can include two controllers, one being a field programmable gate array (FPGA) and the other being a digital signal processor (DSP). The FPGA can be connected to control multi-channel communication using the two transceivers 304a and 304b, for example, and the DSP can be used for real-time processing such as downsampling, upsampling, coding, decoding, and packet formation and processing. In other examples, the control and memory circuit 306 can include any number of controllers including FPGAs, DSPs, microprocessors, application specific integrated circuits (ASICs) or other digital logic circuits.

The control and memory circuit 306 can include one or more volatile or non-volatile memories. For example, the control and memory circuit 306 can include one or more non-volatile memories including read-only memories (ROMs), flash memories, solid state drives, or any other non-volatile memory, and one or more volatile memories including, for example, static or dynamic random-access memories (RAM).

The power interface 308 can be configured to connect through a wired connection to receive power. For example, if the network 100 is implemented on an automobile, the power interface 308 can be connected to receive power from a vehicle power bus, such as a direct current (DC) bus and condition the power for use by the control and memory circuit 306. In some examples, the managers 300a and 300b can also include a backup power source such as a battery, capacitor, or energy harvester circuit. In some examples, the managers 300a and 300b) may not be powered using a wired power connection and may be powered only using a local power source such as a battery or energy harvester.

The communication interface 310 can be configured for wired communication with one or more of another manager 104a and 104b, or a backend system. For example, the communication interface 310 can be configured for wired communication with the ECU 108. The network 100 can be configured to provide sensed data to the ECU 108 for one or more monitored aspects of vehicle operation. In some examples, the managers 300a and 300b can be integrated into the ECU 108 or other backend system. The wired communication can be Ethernet, Controller Area Network (CAN), or any other wired protocol.

The managers 300a and 300b can also be used as the primary manager, responsible for sending out the wake packets. The same transceiver 304a or 304b can be used for sending wake signals as is used for general data communication with the wireless nodes 106a-106h. For example, the manager 300a can send a wake signal to a node 106a-106h through the transceiver 304a using a first modulation, such as OOK, and then use a second, different, modulation for general data communication with the node 106a-106h. In other examples, a manager can use separate transceivers for sending wake signals and for sending general data communication. While described as using separate modulation for the wake signal, the transceivers can use a separate data rate, channel frequency, other wireless link parameter, or a combination thereof for the wake signal.

Figure 4A:
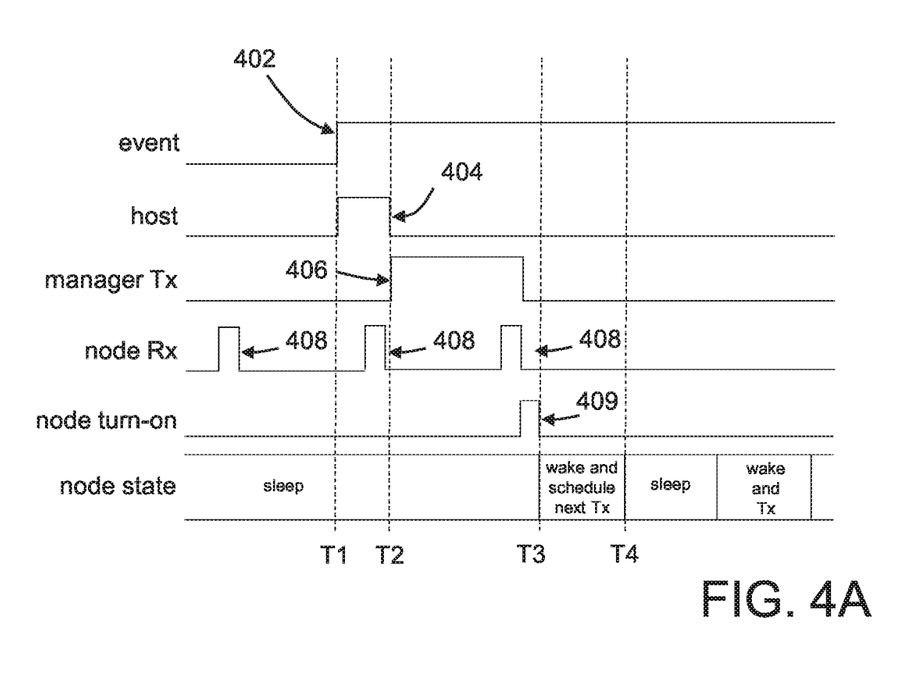
FIG. 4A is a signal diagram illustrating an example system turn-on event for a system without radio-frequency (RF) wakeup.

FIG. 4A is a signal diagram illustrating an example system turn-on event for a system that does not employ RF wakeup. In the example illustrated in FIG. 4A, the turn-on event can be a vehicle start event (e.g., a driver starting a car). At time T1, illustrated by pulse 402, the car 102 is started. At this time, it is desirable to turn on the wireless battery monitoring system. The host application running on the ECU 108, for example, processes the car start event, illustrated by pulse 404. At time T2, a primary manager 104 continuously transmits a turn-on message, illustrated by pulse 406, for one or more wireless nodes 106. Each node 106 wakes up periodically to check for the turn-on message from the manager 104, illustrated by pulses 408. At time T3, the node 106 receives the turn-on command, wakes, and schedules a transmission. At time T4, the wireless node 106 begins collecting data and transmitting data to the manager 104 according to an established transmission schedule, for example.

In one example, the time between pulses 408 can be 220 ms, and to maintain this pulse frequency to check for a turn-on command from the manager 104, the node 106 uses approximately 50 uA of current. As illustrated in FIG. 4A, if the turn-on command from the transmitter occurs shortly after one of the pulses 408, the time between T2 and T3 can be up to 220 ms. To reduce this turn-on latency, the time in which the node 106 turns on (illustrated by pulses 408) can be increased, or the delay between pulses can be decreased, but this increases the amount of power used by the node. To reduce the latency while also reducing the power consumption, the node 106 can employ a wakeup receiver 204.

Figure 4B:
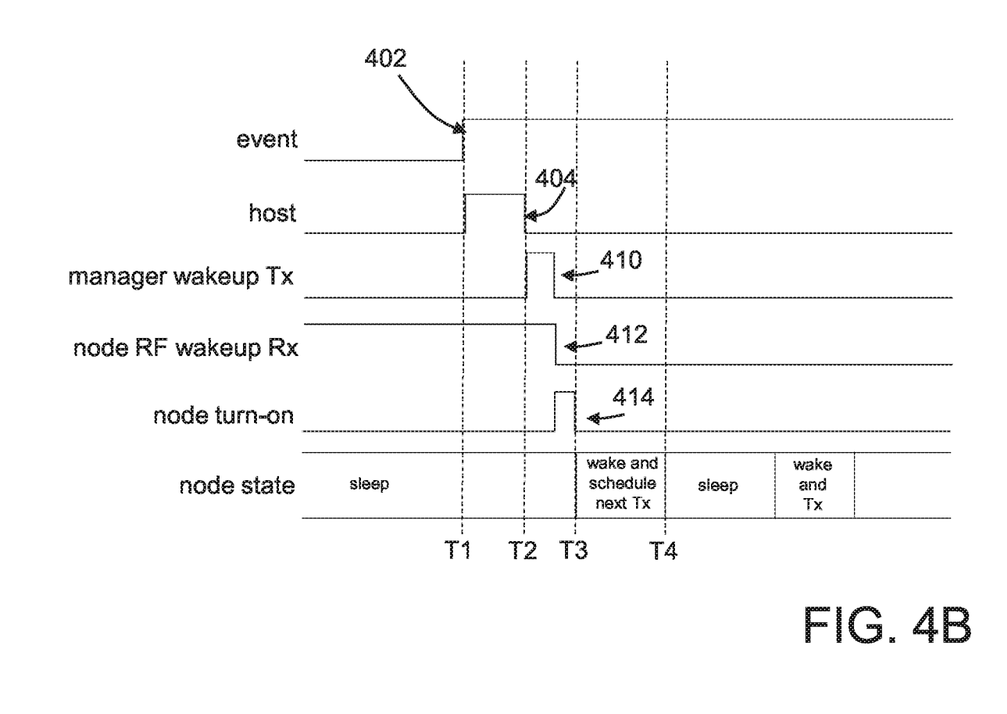
FIG. 4B is a signal diagram illustrating an example system turn-on event for a system using RF wakeup.

FIG. 4B is a signal diagram illustrating an example system turn-on event (e.g., a driver starting a car) for a system using RF wakeup. Similar to FIG. 4A, at time T1, pulse 402 illustrates a turn-on event and pulse 404 illustrates a host application processing the turn-on event. In the system with RF wakeup, upon the host processing the event at time T2, the manager 104 sends a wakeup packet, illustrated as pulse 410, to one or more of the nodes 106. In an example, the wakeup packet can be similar to the wakeup packet illustrated in FIG. 2D. At time T3, the node 106 receives the RF wakeup signal, processes the wake signal, illustrated by pulse 412, and powers on the components of the node 106. At time T4, the wireless node 106 begins collecting data and transmitting data to the manager 104 according to an established schedule, for example.

By using RF wakeup, the maximum time between T2 and T3 can be greatly reduced. For example, using RF wakeup, the time between T2 and T3, as illustrated in FIG. 4B, can be 20 ms. The current used by the node 106 for checking for a turn-on command using RF wakeup can be approximately 10 uA, for example. Thus, by using RF wakeup, the latency for system turn-on can be greatly reduced while at the same time reducing the power consumption of the node 106 during the low-power mode for the vehicle 102.

Figure 5:
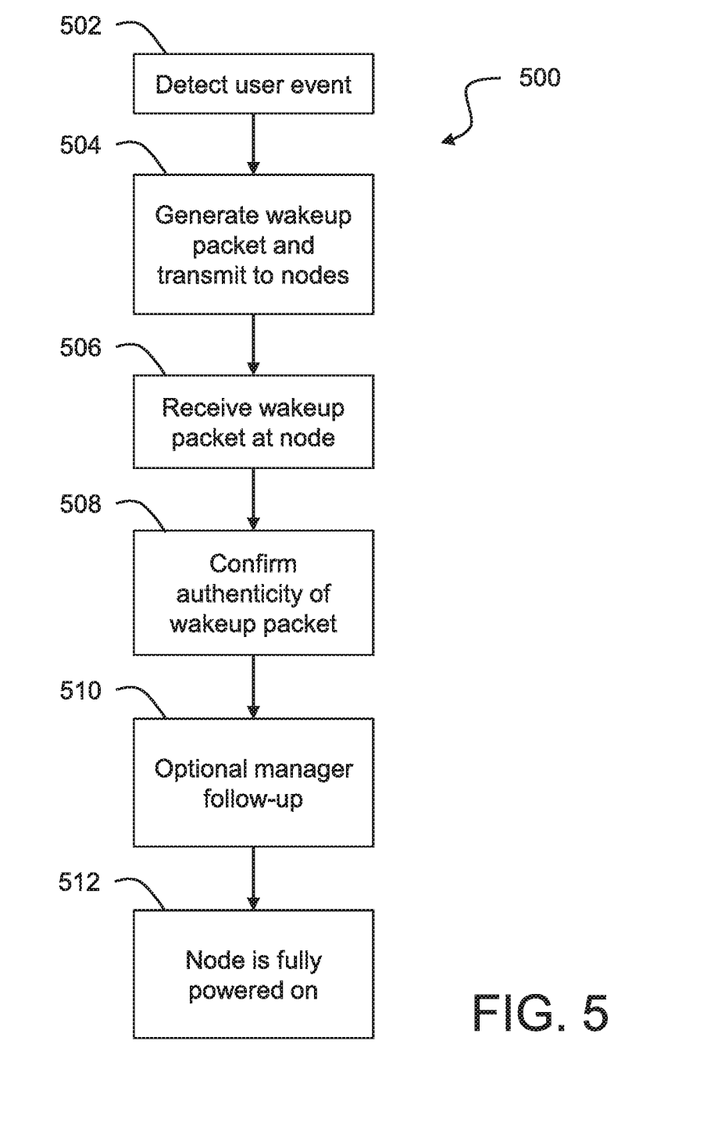
FIG. 5 is a flowchart illustrating a method of sending and receiving RF wakeup communications.

FIG. 5 is a flowchart illustrating a method 500 of waking wireless nodes of a battery monitoring system. At step 502, a user event, such as a driver starting a car, is detected by a host application of a monitoring system, for example. While described using a car start event, any event can trigger a system wakeup, such as a car door opening or closing, for example. At step 504, upon detection of the user event, a wakeup packet is generated for transmission to each node. The wakeup packet can be unique for each node, or can be a single broadcast wakeup packet for transmission to all nodes at the same time.

The wakeup packet can be packaged using any link parameters, and can have different link parameters than other data communication within the system. The wakeup packet can also include security information to prevent an outside device from sending wake commands to turn on the devices. In an example, the wakeup packet can include fields such as a preamble, sync, ID, and other fields. The packet can also include time data to allow the nodes to synchronize respective timers during the low power operation.

At step 506, each node receives a respective wakeup packet. The wakeup packet can be unique for each node or can be a broadcast wakeup packet. The packet is received by the RF wakeup receiver. If the wakeup packet is addressed to a specific node, the respective node will receive the packet and confirm that the packet is intended for itself. At step 508, the node confines the authenticity of the packet and powers on one or more of the remaining components. This confirmation can be through a security field encoded within the packet. In one example, the node can store a security code within a non-volatile memory. Upon receiving a wake packet, the node can compare a code provided in the wake packet with the stored security code. This prevents outside devices from waking up the battery randomly or maliciously.

In some examples, the wakeup signal may not be able to carry much data. In this example, a generic wakeup packet can be sent, and then once the node provisionally wakes up, the manager can send a follow-up packet with security information to confirm the identity of the manager. For example, the node can receive the generic wakeup packet, can turn on its primary transceiver only, and receive the follow-up packet with the security information through the primary transceiver.

At step 510, the node can immediately follow-up with the manager following receipt of the wakeup packet. For example, the manager can send a follow-up packet which can be received by the node's primary transceiver that includes an updated security code for use during the next wakeup event. This way, the code is continuously updated, increasing the security of the system. The follow-up packet can also include further security measures beyond what can be included in the initial wakeup packet, can include a communication schedule, or can include any other information that the manager wishes to immediately communicate with the node. At step 512, the node is fully powered on and begins communicating data with the manager according to an established transmission schedule, for example.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for monitoring components of an automobile, the system comprising:
   a manager positioned on the automobile and configured to wirelessly transmit a wake signal_in response to an event identified for the automobile; and
   a wireless node positioned to sense characteristics of one or more battery cells of a battery pack of the automobile to obtain sensed data, the wireless node comprising:
   a first antenna;
   a wakeup circuit connected to the first antenna and configured to monitor for the wake signal, wherein upon receipt of the wake signal, the wireless node is configured to confirm authenticity of the wake signal based on content of the wake signal to confirm the wake signal is from the manager; and
   a node transceiver configured to perform wireless communication with the manager to communicate the sensed data, wherein the wakeup circuit is configured to power on the node transceiver upon receipt of the wake signal and the confirmation that the wake signal is from the manager.

2. The system of claim 1, wherein the wakeup circuit is a separate receiver from the node transceiver.

3. The system of claim 2, wherein the node transceiver is connected to the first antenna in parallel with the wakeup circuit.

4. The system of claim 1, wherein the wireless node further comprises a second antenna, wherein the node transceiver is connected to perform the wireless communication with the manager through the second antenna.

5. The system of claim 1, wherein the manager comprises:
   a manager transceiver configured to transmit data to the wireless node and receive data transmitted by the node transceiver;
   wherein the manager transceiver is also configured to transmit the wake signal for the wireless node.

6. The system of claim 5, wherein the manager transceiver is configured to transmit the wake signal using a first modulation scheme and transmit the data to the wireless node using a second modulation scheme different than the first modulation scheme.

7. The system of claim 1, wherein the manager comprises:
   a first manager transceiver configured to transmit the wake signal to the wireless node; and
   a second manager transceiver configured to transmit data to the wireless node and receive data transmitted by the node transceiver.

8. The system of claim 1, further comprising:
   a secondary manager positioned on the automobile and configured to wirelessly communicate with the wireless node, wherein the secondary manager is configured to receive the wake signal and exit a sleep mode upon receipt of the wake signal.

9. The system of claim 1, wherein the wireless node further comprises a sensor configured to sense a current through or a voltage across the one or more battery cells, and wherein the wireless node is configured to power on the sensor upon receipt of the wake signal.

10. The system of claim 1, wherein the wake signal is a wake packet that includes a security code, and wherein the wakeup circuit is configured to confirm the authenticity of the wake signal by confirming an identity of the manager using the security code.

11. A method of powering on a system for monitoring a component of an automobile, the method comprising:
    transmitting, by a manager positioned on the automobile, a wakeup signal in response to an event identified for the automobile;
    receiving, by a wakeup circuit of a wireless node, the wakeup signal through an antenna connected to the wakeup circuit, wherein the wireless node is positioned to monitor one or more battery cells of a battery pack of the automobile;
    upon receipt of the wakeup signal, confirming authenticity of the wakeup signal, by the wireless node, based on content of the wakeup signal to confirm the wakeup signal is from the manager;
    powering on, by the wakeup circuit, a node transceiver of the wireless node in response to receipt of the wakeup signal;
    sensing, by the wireless node, one or more characteristic of the one or more battery cells to obtain monitored data; and
    transmitting, by the node transceiver, the monitored data to the manager.

12. The method of claim 11, wherein the wakeup circuit is a wakeup receiver positioned on the wireless node and separate from the node transceiver.

13. The method of claim 11, wherein the wakeup circuit integrated with the node transceiver.

14. The method of claim 11, further comprising:
    receiving, by a secondary manager positioned on the automobile, the wakeup signal; and
    exiting, by the secondary manager, a sleep mode upon receipt of the wakeup signal.

15. The method of claim 11, further comprising:
    powering on, by the wakeup circuit, a sensor of the wireless node in response to receipt of the wakeup signal; and
    wherein sensing the one or more characteristics comprises sensing, by the sensor, a current through or a voltage across the one or more battery cells.

16. The method of claim 15, wherein transmitting, by the manager positioned on the automobile, the wakeup signal in response to the event comprises transmitting the wakeup signal in response to a user start command for the automobile.

17. The method of claim 11, wherein the method further comprises monitoring, by the wakeup receiver, for the wakeup signal by duty cycling a receiver power of the wakeup receiver.

18. The method of claim 11, wherein the wakeup signal is a wakeup packet that includes security data, and wherein confirming authenticity of the wake signal comprises confirming an identity of the manager using the security data.

19. A system for wirelessly monitoring a component of an automobile, the system comprising:
    a first manager positioned on the automobile and configured to wirelessly transmit at least one wakeup packet in response to an event identified for the automobile;
    a plurality of wireless nodes each positioned to sense characteristics of one or more battery cells of a battery pack of the automobile to obtain sensed data, each wireless node comprising:
    an antenna;
    an radio-frequency (RF) wakeup circuit connected to the antenna and configured to monitor received radio-frequency energy for the at least one wakeup packet, wherein upon receipt of the wakeup packet, the respective wireless node is configured to confirm authenticity of the wakeup packet based on content of the wakeup packet to confirm the wakeup packet is from the manager; and a node transceiver configured to perform wireless communication with the manager to communicate the sensed data, wherein the RF wakeup circuit is configured to power on the node transceiver upon receipt of the wakeup packet.

20. The system of claim 19, further comprising:

a second manager positioned on the automobile and configured to communicate wirelessly with the plurality of wireless nodes, wherein the second manager operates in a low power mode prior to the event;

wherein the second manager is configured to monitor for the at least one wakeup packet and exit the low power mode upon receipt of the at least one wakeup packet.

\* \* \* \* \*